United States Patent
Bertogg

(10) Patent No.: US 8,447,575 B2
(45) Date of Patent: May 21, 2013

(54) COMPUTER SYSTEM METHOD FOR DETERMINING AN EARTHQUAKE IMPACT

(75) Inventor: Martin Bertogg, Zurich (CH)

(73) Assignee: Swiss Reinsurance Company Ltd., Zuerich (CH)

( * ) Notice: Subject to any disclaimer, the term of this patent is extended or adjusted under 35 U.S.C. 154(b) by 105 days.

(21) Appl. No.: 13/059,144

(22) PCT Filed: Aug. 21, 2008

(86) PCT No.: PCT/CH2008/000353
§ 371 (c)(1),
(2), (4) Date: Apr. 27, 2011

(87) PCT Pub. No.: WO2010/020059
PCT Pub. Date: Feb. 25, 2010

(65) Prior Publication Data
US 2011/0196810 A1   Aug. 11, 2011

(51) Int. Cl.
*G06F 7/60* (2006.01)
*G06F 19/00* (2011.01)
*G01V 3/00* (2006.01)
*G01V 1/00* (2006.01)

(52) U.S. Cl.
USPC ............. 703/2; 702/1; 702/2; 702/14; 702/18

(58) Field of Classification Search
USPC .................................. 703/2; 702/1, 2, 14, 18
See application file for complete search history.

(56) References Cited

U.S. PATENT DOCUMENTS

| | | | | |
|---|---|---|---|---|
| 5,771,170 A * | 6/1998 | Withers et al. | ................... | 702/16 |
| 6,853,922 B2 * | 2/2005 | Stark | ............................... | 702/14 |
| 6,859,416 B2 * | 2/2005 | Inubushi | ......................... | 367/14 |
| 7,499,374 B2 * | 3/2009 | Ferber | .............................. | 367/58 |

* cited by examiner

*Primary Examiner* — Omar Fernandez Rivas
*Assistant Examiner* — Nithya J Moll
(74) *Attorney, Agent, or Firm* — Oblon, Spivak, McClelland, Maier & Neustadt, L.L.P.

(57) ABSTRACT

For determining an impact index which indicates the image or damage caused by an earthquake to a portfolio, an equation is stored for calculating a local earthquake intensity for a geographical location. The portfolio includes geographical locations and individual weighting factors assigned to the geographical locations. Furthermore, for the geographical locations stored are one or more impact ratio tables including impact ratios for different earthquake intensity levels. The impact index is calculated for the geographical locations by determining in each case the impact ratio for the local intensity at the respective geographical location, and adding up the impact ratios weighted in each case by the weighting factor assigned to the respective geographical location. An impact index that reflects the geographical distribution of the portfolio can be determined, without the need for a network of seismological measurement stations associated with the geographical locations.

9 Claims, 5 Drawing Sheets

COMPUTER SYSTEM METHOD FOR DETERMINING AN EARTHQUAKE IMPACT

FIELD OF THE INVENTION

The present invention relates to a computer system and a method for determining an impact index indicative of the impact or damage caused by an earthquake. Specifically, the present invention relates to a computer system and a computer-implemented method for determining an impact index indicative of the impact or damage caused by an earthquake to a pre-defined portfolio of objects or values of property or non-property nature, associated with different geographical locations.

BACKGROUND OF THE INVENTION

An earthquake impact (or damage) index is used to quantitatively approximate the impact or damage caused by an earthquake to a pre-defined portfolio of values of property or non-property nature, associated with different geographical locations, e.g. a portfolio relating to buildings, bridges, highways, power lines, communication lines, manufacturing plants or power plants, but also non-physical values, e.g. business interruption, contingent business interruption values or exposed population, based solely on physically measured and publicly available parameters of the earthquake phenomenon itself. An earthquake impact index is based on a pre-defined set of rules and can be assessed immediately after the earthquake. Defining the earthquake impact index solely on a measured magnitude of the earthquake has the disadvantage that there is no consideration of the portfolio and its geographical distribution of objects. Consequently, an earthquake impact index based solely on the magnitude of the earthquake correlates poorly with the true damage caused to the assets (objects) included in the portfolio. Particularly, with an increase of the geographical area in which the geographical locations are distributed, the magnitude based impact index shows an increasingly poor correlation with the true damage. Thus, other methods use other physical parameters of an earthquake occurrence than magnitude, i.e. earthquake shaking intensity in form of peak ground acceleration or peak ground velocity. Such parameters depict in areas of the world equipped with a dense net of seismograph stations a map of the aerial extent of earthquake shaking intensity, rather than only a single point measurement of the magnitude. Combining the aerial extent of earthquake shaking intensity with the distributed portfolio of objects allows for a much better correlation of the thus deducted earthquake impact index with really occurred impact or damage to the portfolio, while not sacrificing the immediateness of applicability after the event, as well as transparency to anyone willing to set up the computing procedure. However, owing to the cost of installation and maintenance, an infrastructure with a network of geographically densely distributed seismological measurement stations is currently not available in the majority of countries.

SUMMARY OF THE INVENTION

It is an object of this invention to provide an alternative computer system and an alternative computer-implemented method for determining an impact index indicative of the damage or impact caused by an earthquake to a portfolio of values or objects associated with different geographical locations. In particular, it is an object of the present invention to provide a computer system and a computer-implemented method for determining the impact index with consideration of the geographical distribution of the portfolio of values or objects. Furthermore, it is an object of the present invention to provide a computer system and a computer-implemented method for determining the impact index without the need for an infrastructure having a network of geographically densely distributed seismological measurement stations.

According to the present invention, these objects are achieved particularly through the features of the independent claims. In addition, further advantageous embodiments follow from the dependent claims and the description.

According to the present invention, the above-mentioned objects are particularly achieved in that, for determining an impact index indicative of the impact or damage caused by an earthquake to a portfolio of values or objects associated with different geographical locations, stored is an equation defined for calculating, for a geographical location, a local earthquake intensity, based on a given distance of the geographical location from a hypocenter of an earthquake, and a given earthquake magnitude of the earthquake. Calculating local intensity values, e.g. local shaking intensity values, makes it possible to estimate a local earthquake impact, without the requirement of seismological measurement stations at the respective geographical location. For example, the geographical locations are defined by coordinates i.e. longitude and latitude values. For the geographical locations, one or more impact ratio tables are stored. The impact ratio tables define in each case impact (or damage) ratios for different earthquake intensity levels. For example, different impact ratio tables are assigned to different geographical locations. Stored is portfolio data, which includes geographical locations and individual weighting factors assigned to the geographical locations. Calculated are geometric distances of the geographical locations from a hypocenter of an earthquake event. For the geographical locations, local intensity values are determined by using in each case the stored equation to calculate the local intensity from the magnitude of the earthquake event and the geometric distance of the respective geographical location from the hypocenter. Subsequently, the impact index is calculated for the geographical locations by determining in each case, from the impact ratio table, the impact (or damage) ratio for the local intensity at the respective geographical location, and adding up the impact (or damage) ratios, weighted in each case by the weighting factor assigned to the respective geographical location.

The proposed system and method make it possible to compute the impact index based on magnitude and location parameters from a past earthquake, from an artificial earthquake scenario, and predominately from an earthquake event having occurred recently, e.g. within the contract period of a structured financial product which depends on the value of the earthquake impact index. The proposed system and method make it possible to add a new form of index measure, a parametric model index, to already existing index measures used for structured financial products. The proposed system and method use a simplified earthquake model approach as a basis for the parametric model index. The proposed system and method make it possible to simplify already existing earthquake models for insurance loss and risk assessment. Specifically, after an event applicable to a particular structured financial product, the proposed method and system make it possible to determine the impact index solely based on magnitude, depth and coordinates of an earthquake (hypocenter), as published by a pre-defined seismological agency. Furthermore, the proposed method and system make it possible to determine an impact index that reflects the geographical distribution of a portfolio, without the need for a network of seismological measurement stations associated with the geographical locations included in the portfolio.

In an embodiment, the weighting factors are indicative in each case of a nominal value associated with the geographical location. Furthermore, the impact (or damage) ratios weighted by the weighting factors are indicative in each case of a nominal loss (or impact) at a geographical location. Hence, the impact index is indicative of a total nominal event loss or event impact.

In an embodiment, a minimum and a maximum total nominal event loss (or impact) are stored for the portfolio, and an event loss factor is calculated as a ratio of the event loss or impact exceeding the minimum total nominal event loss, but not exceeding the maximum total nominal event loss, and the difference of the maximum total nominal event loss and the minimum total nominal event loss. For example, a coverage amount is stored for the portfolio, and a payout amount is calculated by multiplying the event loss factor with the coverage amount. Thus, using the event loss factor, the actual payout can be scaled to various sizes of earthquakes, be it by not considering small earthquakes or limiting the pay-out for very large earthquakes.

Depending on the embodiment, provided is a user interface for receiving from a user the impact ratios for different earthquake intensity levels, the weighting factors assigned to the geographical locations, and/or parameters and mathematical operations for defining the equation.

In addition to a computer system and a computer-implemented method for determining an impact index indicative of the impact or damage caused by an earthquake to a portfolio associated with geographical locations, the present invention also relates to a computer program product including computer program code means for controlling one or more processors of a computer system such that the computer system performs the method, particularly, a computer program product including a computer readable medium containing therein the computer program code means.

Preferably, the computer program product includes computer program code means for controlling the computer such that the computer system and the computer-implemented method for determining the earthquake impact index are applicable to a structured financial product. Specifically, the computer program product includes computer program code means for controlling the computer such that the computer applies the impact index to the structured financial product.

The proposed system and method make it possible for anyone to assess the earthquake impact index right after an earthquake event (or for any conceived earthquake) defined only by magnitude, depth and coordinates. The computer program product can be distributed in an electronic format in parallel with other supporting information for the structured financial product. Thus the proposed system and method provide full transparency to investors of a structured financial product based on the impact index by making it possible for the investors to perform on their own pre- and/or post-assessments based on publicly available data.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
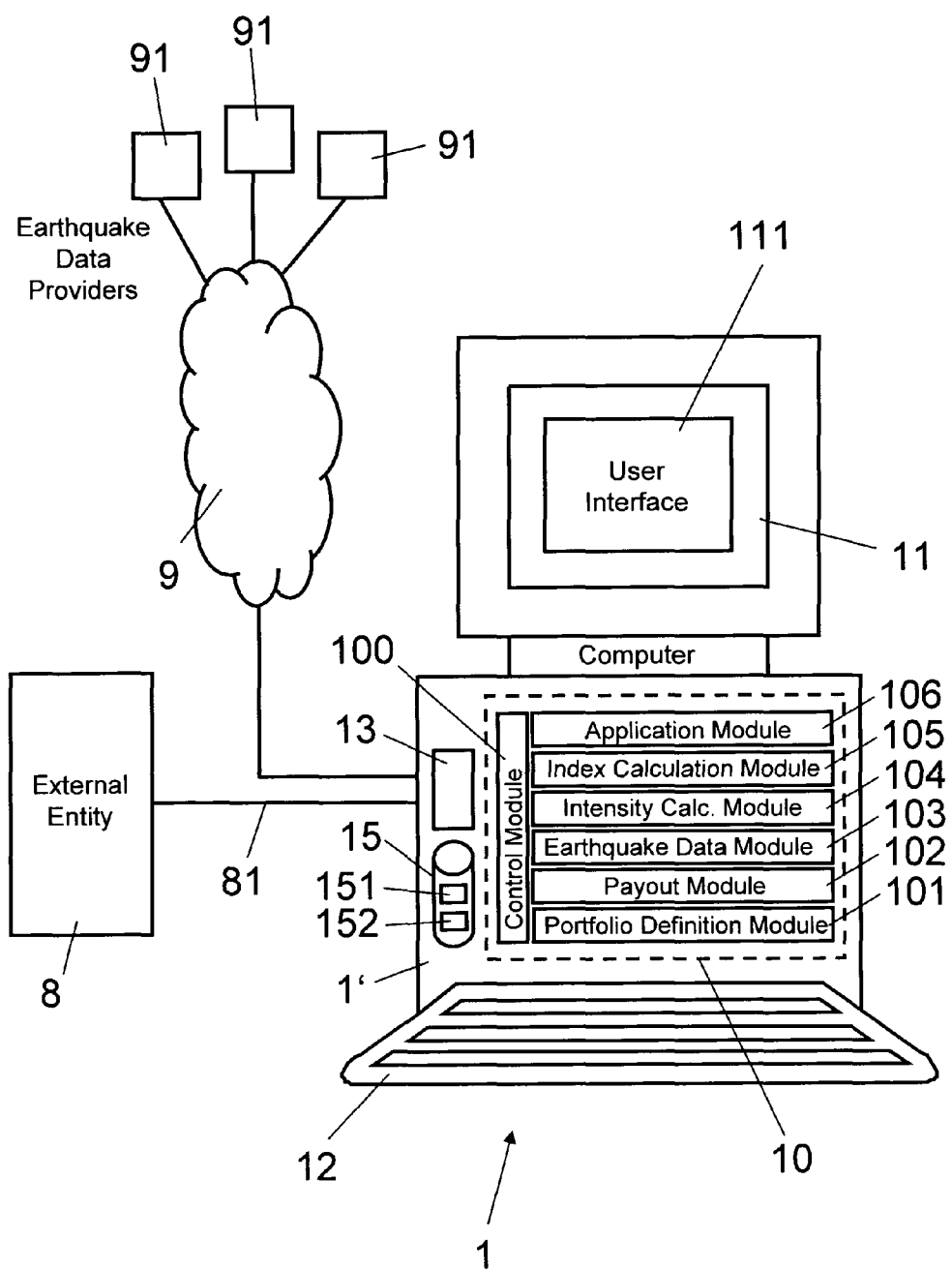
FIG. 1 shows a block diagram illustrating schematically an exemplary configuration of a computer system for practicing embodiments of the present invention, said configuration comprising a computer with a display and data entry means.

In FIG. 1, reference numeral 1 refers to a computer system for determining an impact index indicative of the impact or damage caused by an earthquake to a portfolio of values or objects associated with geographical locations. For example, the portfolio relates to objects or values of property or non-property nature, e.g. non-physical values such as business interruptions, contingent business interruption values or exposed population. As is illustrated in FIG. 1, the computer system includes a computer 1', connected to a display 11 and to data entry means 12 such as a keyboard and/or a pointing device. The computer 1' is provided with one or more processors and is implemented as a personal computer, for example.

In FIG. 1, reference numeral 10 refers to functional modules of the computer system 1: a control module 100, a portfolio definition module 101, a payout module 102, an earthquake data module 103, an intensity calculation module 104, an index calculation module 105 and an application module 106. The functional modules 10 are implemented preferably as programmed software modules stored on a computer readable medium, connected fixed or removable to the processor (s) of the computer 1'. One skilled in the art will understand, however, that the functional modules 10 can also be implemented fully or in part by means of hardware.

As is illustrated schematically in FIG. 1, the computer system 1 includes a communication module 13 for exchanging data with one or more earthquake data providers 91 via a telecommunications network 9. The telecommunications network 9 includes a fixed network and/or a mobile radio network. The communication module 13 is also configured to exchange data with an external entity 8, such as a printer, a display, a database, or another computer via communication link 81. Although not illustrated, communication link 81 may be part of telecommunications network 9. The computer system 1 also includes a database 15, implemented as a relational database, a spreadsheet or another structured data file.

Figure 2:
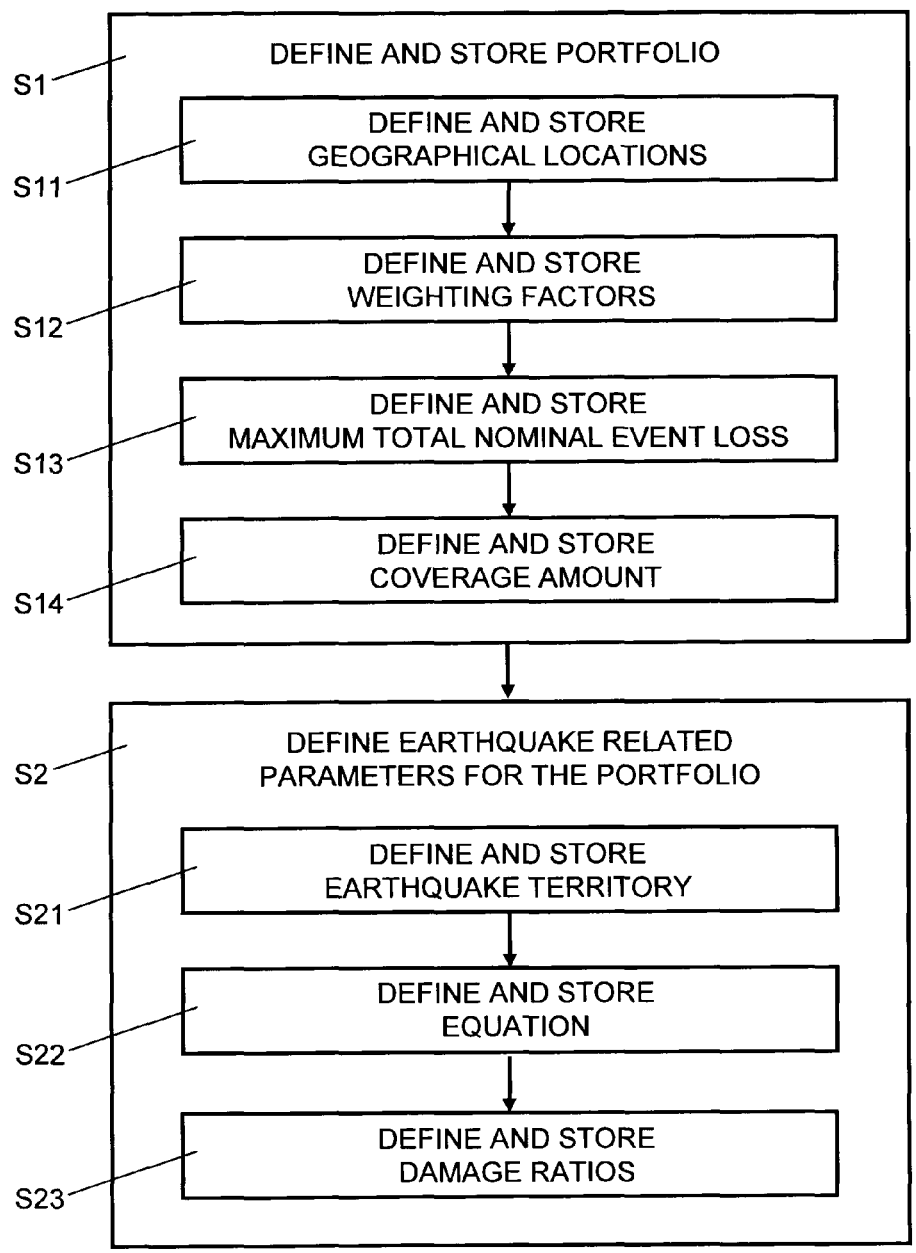
FIG. 2 shows a flow diagram illustrating an example of a sequence of preparatory steps executed according to the present invention for determining an earthquake impact index.
Figure 5:
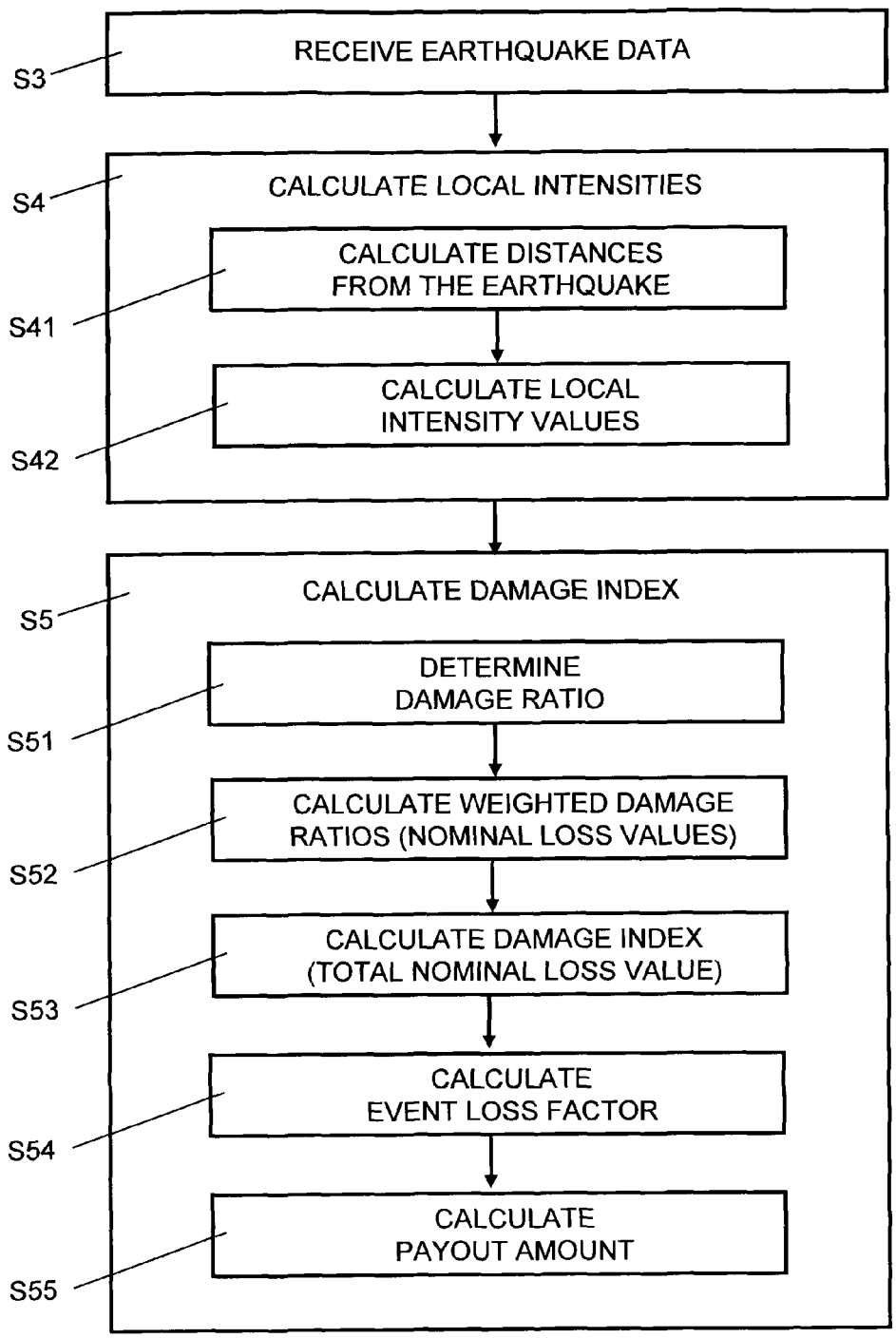
FIG. 5 shows a flow diagram illustrating an example of a sequence of steps executed according to the present invention for determining an earthquake impact index.

The control module 100 is configured to provide to the user of the computer system 1 a user interface 111 for selecting and activating the functional modules 10, as well as enter various parameters described later in more detail. The user interface 111 is shown on display 11. Data and control commands are entered by the user using data entry means 12. When selecting the portfolio definition module 101, computer 1' executes steps S1 and S2 as illustrated in FIG. 2. When selecting the earthquake data module 103, computer 1' executes step S3 as illustrated in FIG. 5. When selecting a calculation option, the intensity calculation module 104 executes step S4 and the index calculation module 105 executes step S5 as illustrated in FIG. 5. The earthquake data module 103 may trigger automatically execution of calculation modules 104 and 105.

The portfolio definition module 101 is configured to provide to the user of the computer system 1 a user interface 111 for defining a portfolio of values or objects associated with a geographical area. As is illustrated in FIG. 2, in step S1, the portfolio is defined by the user. For example, the portfolio is given an identifier such as a name or a number. Portfolio data is stored in a portfolio data store 152 of database 15.

Figure 3:
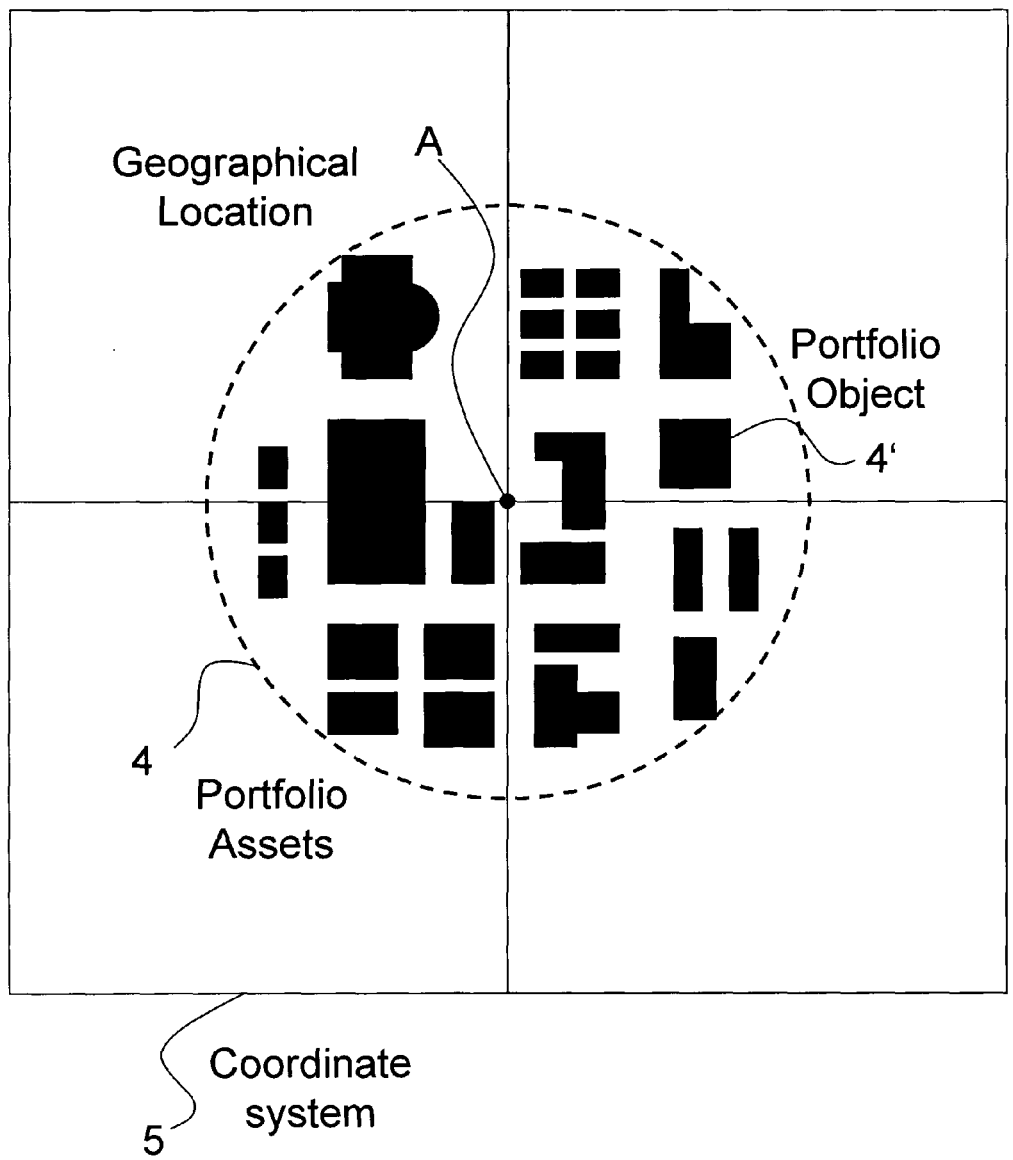
FIG. 3 shows an individual geographical location with associated portfolio assets.
Figure 4:
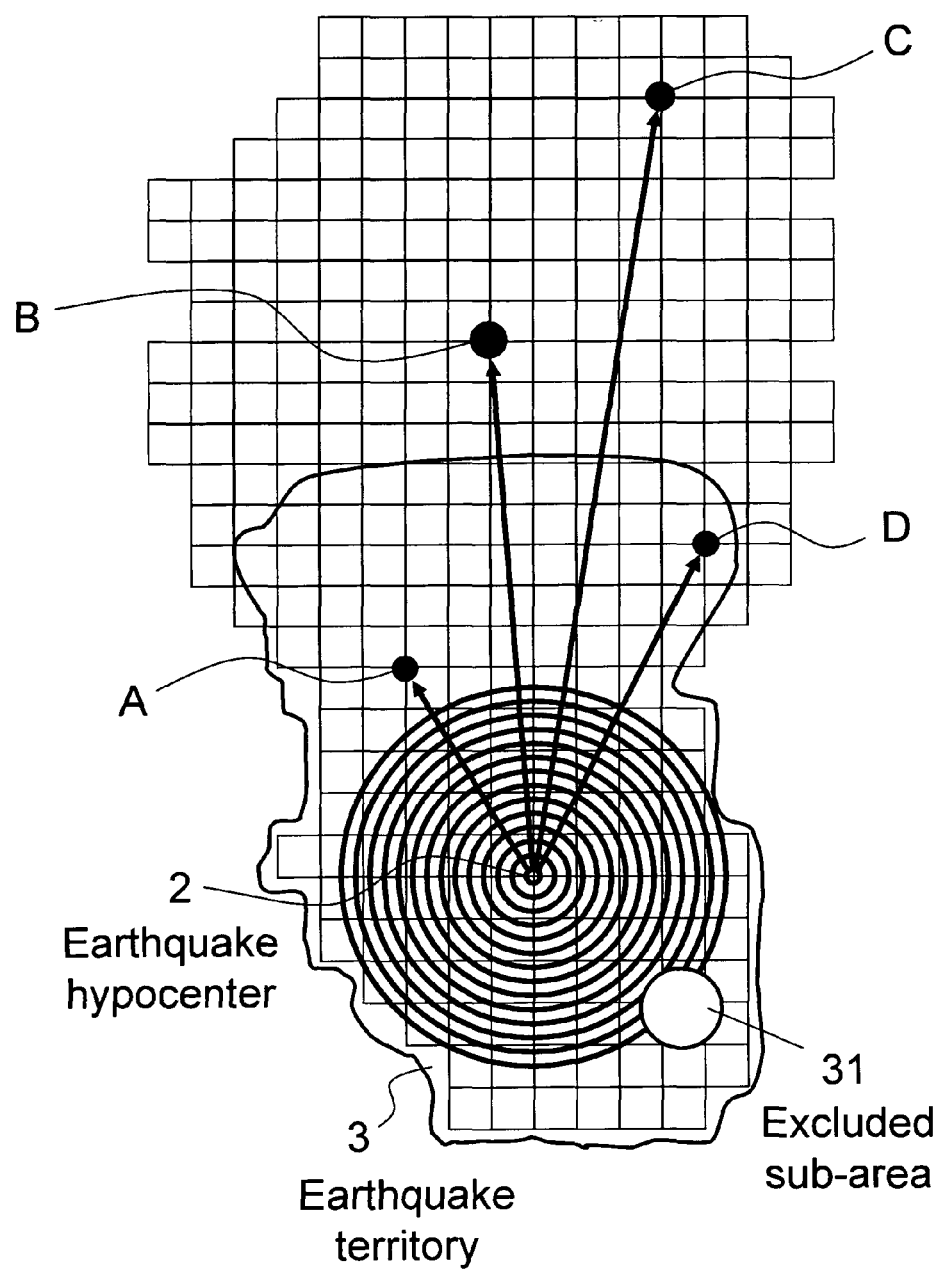
FIG. 4 illustrates an example of an earthquake territory and geographical locations associated with a portfolio of values or objects.

In step S11, the geographical locations A, B, C, D to be associated with the portfolio are defined as shown in FIG. 4. For example, the geographical locations A, B, C, D are defined by making selections from a list or by specifying the geographical locations in a map shown graphically on display 11. Coordinates or other location information defining the geographical locations A, B, C, D are stored in the portfolio data store 152 of database 15 assigned to the portfolio defined in step S1. FIG. 3 shows an example of an individual geographical location A, associated with coordinates of a coordinate system 5 and related to local portfolio assets 4, comprising local portfolio objects 4'.

In step S12, weighting factors for the geographical locations A, B, C, D to be associated with the portfolio are received from the user, e.g. via user interface 111. For example, the weighting factors are selected for weighting according to power output, e.g. 1M USD/MW (moment magnitude), according to reconstruction value, or another criteria selected by the user. The weighting factors are stored in the portfolio data store 152 of database 15, assigned in each case to the geographical data defining the geographical locations of the portfolio. Table 1 shows different examples of weighting factors assigned to the geographical locations A, B, C, D.

TABLE 1

| Geographical Location | Example 1 Nominal Value (e.g. 1M USD/MW) | Example 2 Operational Characteristics and Civil Works [M USD] |
|---|---|---|
| A | 10'000 | 15'560 |
| B | 2'600 | 8'510 |
| C | 2'100 | 3'930 |
| D | 2'100 | 3'670 |

In step S13, a minimum total nominal event loss and a maximum total nominal event loss (or impact) are received from the user, e.g. via user interface 111, or determined automatically based on the nominal values defined in step S12. The defined values of the minimum and maximum total nominal event loss are stored for the portfolio in the portfolio data store 152 of database 15.

In step S14, a coverage amount is received from the user and stored for the portfolio in the portfolio data store 152 of database 15.

In step S2, the portfolio definition module 101 receives and stores earthquake related parameters to be associated with the portfolio.

In step S21, received from the user, e.g. via user interface 111, is earthquake territory data which defines a geographical area. The portfolio is limited to earthquake events occurring in the geographical area defined by the earthquake territory data, i.e. the earthquake territory 3. For example, the earthquake territory 3 is defined by a set of coordinates defining the perimeter of the respective geographical area. In an embodiment, the earthquake territory data also defines excluded geographical sub-areas 31 which are to be excluded from the earthquake territory 3, e.g. an area of a defined radius around a dam. The earthquake territory data is stored for the portfolio in the portfolio data store 152 of the database 15. In an embodiment, it is also possible for the user to specify for the portfolio a minimum magnitude level, e.g. 5.5 Mw (Moment Magnitude); earthquakes having a magnitude below this level, will be ignored for the portfolio.

In step S22, received from the user, e.g. via user interface 111, are parameters and mathematical operations for defining an equation I=f(M, Dist) which is used to calculate, for a geographical location, a local earthquake intensity I, based on a given distance Dist of the geographical location from a hypocenter of an earthquake event, and a given earthquake magnitude Magn of the earthquake event (e.g. Moment Magnitude). For example, the mathematical equation is defined as shown below, and the user specifies and/or alters its parameters $c_1$, $c_2$, $c_3$, $c_4$:

$$I = c_1 + c_2 \text{Magn} - c_3 \log \text{Dist} - c_4 \text{Dist} \tag{1}$$

For example, the default values for the parameters are $c_1=6.4$, $c_2=1.45$, $c_3=1.95$, and $c_4=0.0$. Alternatively, the user may define its own equation or attenuation formula, and associated parameters for determining the local intensities. The equation and its associated parameters are stored for the portfolio in the portfolio data store 152 of database 15.

In step S23, received from the user, e.g. via user interface 111, are impact (or damage) ratios for different earthquake intensity levels. Table 2 illustrates an example of impact ratios for shaking intensities. Shaking intensities in the range of VI-VII lead to damages to ordinary masonry buildings, but hardly to a collapse. Concrete buildings would get damaged at levels in the range VII-VIII. The impact ratios are stored for the portfolio in an impact (or damage) ratio table 151 of the database 15.

TABLE 2

| Default Values | | Alternative User Selection | |
|---|---|---|---|
| Intensity | Impact Ratio | Intensity | Impact Ratio |
| <VII.0 | 0% | <x | 0% |
| >=VII.0 | 10% | >=... | % |
| >=VII.2 | 20% | >=... | % |
| >=VII.4 | 30% | >=... | % |
| >=VII.6 | 40% | >=... | % |
| >=VII.8 | 50% | >=... | % |
| >=VIII.0 | 60% | >=... | % |
| >=VIII.2 | 70% | >=... | % |
| >=VIII.4 | 80% | >=... | % |
| >=VIII.6 | 90% | >=... | % |
| >=VIII.8 | 100% | >=y | % |

The earthquake data module 103 is configured to execute step S3. As is illustrated in FIG. 5, in step S3, earthquake data, including the location of a hypocenter 2 (defined by its longitude, latitude, and depth) and the magnitude of a real or simulated (hypothetical) earthquake, is received in computer 1'. The earthquake data module 103 is configured to provide to the user of the computer system 1 a user interface for entering the earthquake data with data entry means 12. Alternatively or in addition, earthquake data module 103 is configured to receive the earthquake data from earthquake data providers 91 via telecommunications network 9. The earthquake data providers 91 include seismological measurement stations and/or data centers. The earthquake data is stored in database 15. In an embodiment, in step S21, identification data of the reporting agency, e.g. NEIC (National Earthquake Information Centre) which determines the earthquake location and magnitude is received from the user, e.g. via user interface 111, and stored for the portfolio in the portfolio data store 152 of database 15.

The intensity calculation module 104 is configured to calculate in step S4 the local intensities for the geographical locations associated with the portfolio.

In step S41, calculated is the distance of the geographical locations A, B, C, D from the earthquake hypocenter 2, as defined by the earthquake data received in step S3. For example, the distance Dist is calculated based on the coordinates (longitude, latitude) and depth of the earthquake's hypocenter 2, as shown below:

$$D = \cos(lat1) * \cos(lon1) * \cos(lat2) * \cos(lon2) + \cos(lat1) * \sin(lon1) * \cos(lat2) * \sin(lon2) + \sin(lat1) * \sin(lat2) \quad (2)$$

$$Dist = \sqrt{(acos(D) * 6378 \text{ km})^2 + Depth^2} \quad (3)$$

In step S42, the local (shaking) intensity is calculated in each case for the portfolio's geographical locations A, B, C, D. The individual local intensity values are calculated using the equation defined and stored for the portfolio in step S22, based on the earthquake magnitude and the respective distances from the earthquake's hypocenter 2.

The index calculation module 105 is configured to calculate, in step S5, the earthquake impact (or damage) index as an indicator of the impact or damage caused by the earthquake to the portfolio of values or objects associated with the geographical locations A, B, C, D.

In step S51, for the geographical locations A, B, C, D, the impact (or damage) ratios corresponding to the local intensity value are determined in each case from the impact (or damage) ratio table 151 defined in step S23.

In step S52, the impact (or damage) ratios for the portfolio's geographical locations A, B, C, D are weighted in each case by the respective weighting factors. Table 3 shows an example based on the nominal values from Table 1, assuming local intensity values that result in impact ratios of 60% and 10% for geographical locations B or C, respectively, and 0.0% for the geographical locations A and D. Weighting nominal values with the respective impact ratios results in nominal loss values for the geographical locations A, B, C, D.

TABLE 3

| Geographical Location | Nominal Value (1M USD/MW) | Impact Ratio | Nominal Loss (Nominal Value * Impact Ratio) |
|---|---|---|---|
| A | 10'000 | 0% | 0 |
| B | 2'600 | 60% | 1'560 |
| C | 2'100 | 10% | 210 |
| D | 2'100 | 0% | 0.0 |
| Total nominal event Loss: | | | 1'770 |

In step S53, the impact (or damage) index is calculated as the total nominal loss value by adding up the weighted impact ratios for the portfolio's geographical locations A, B, C, D. In other words, the total nominal loss value is calculated as the sum of nominal losses at each geographical location associated with the portfolio.

In (optional) step S54, an event loss factor is calculated as a ratio of the event loss or impact exceeding the minimum total nominal event loss, but not exceeding the maximum total nominal event loss, divided by the difference of the maximum total nominal event loss minus the minimum total nominal event loss defined in step S13. As illustrated in Table 4, with a maximum total nominal event loss of 13,000, an event loss factor of 13.6% results for the total nominal event loss of 1,770 of Table 3. For a total nominal event loss exceeding or equal to the maximum total nominal event loss, the event loss factor is 100%.

TABLE 4

| Total Nominal Event Loss | Event Loss Factor (Final Payout Percentage) | User's Alternative Payout Scheme |
|---|---|---|
| 0 | 0% | <=x |
| 1'770 | 13.6% | |
| ... | ... | ... |
| 7'870 | 60% | |
| ... | ... | ... |
| >=13'000 | 100% | >=y |

In (optional) step S55, the payout module 102 calculates the payout amount based on the coverage amount defined in step S14 and the event loss factor. For example, for a total coverage amount of 100M USD, the event loss factor of 13.6% results in a payout of 13.6M USD. As indicated in Table 4, rather than just a maximum total nominal event loss and a linear payout scheme, in step S13, the user may define, e.g. via user interface 111, an alternative (e.g. non linear) payout scheme for the portfolio.

Table 5 shows three examples of earthquake events and resulting event loss factors for different geographical locations.

TABLE 5

| Example | Magnitude | Depth | Distance | Nominal Event Loss | Event Loss Factor (Payout Percentage) |
|---|---|---|---|---|---|
| i) | 7.5 Mw | 10 km | 70 km | 13'180 | 100% |
| ii) | 8.0 Mw | 10 km | 300 km | 1'150 | 8.9% |
| iii) | 5.5 Mw | 5 km | 40 km | 260 | 2.0% |

Application module 105 is configured to execute one or more functions for further processing of the impact (or damage) index. A simulation function defines different sets of earthquake data for hypothetical earthquakes affecting hypothetically the geographical locations A, B, C, D. For each set, the simulation function stores the impact index assigned to the earthquake data. The simulation function makes it possible to forecast impacts/damages estimated for different earthquakes. For purposes of urban planning, at least some of the portfolio objects are only virtual (planned) objects and the simulation function helps to select locations of planned objects with regards to minimum earthquake impact/damage. An interface function transmits the impact index via communication link 81 to external entity 8 for printing, displaying, storing or further processing of the impact index, respectively. A trigger function compares the impact index to a defined threshold value and triggers execution of a further function, if the impact index exceeds the threshold value. For example, the further function is an alarm function activating or displaying alarm indicators, and/or transmitting alarm messages. In the context of a structured financial product, such as an earthquake insurance fund, the portfolio represents a portfolio of assets, for example an insurance portfolio of insured objects, and the nominal values define asset values, for example insured values of portfolio objects.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

What is claimed is:

1. A computer system for determining an impact index indicative of impact or damage caused by an earthquake to a portfolio of values or objects associated with different geographical locations, the system comprising:
- at least one hardware processor;
- means for storing an equation defined for calculating for a geographical location a local earthquake intensity based on a given distance of the geographical location from a hypocenter of an earthquake, and a given earthquake magnitude of the earthquake;
- at least one impact ratio table for storing for the geographical locations in each case impact ratios for different earthquake intensity levels;
- a portfolio data store including geographical locations and individual weighting factors assigned to the geographical locations, wherein the weighting factors are indicative in each case of a nominal value associated with the geographical location, the impact ratios weighted by the weighting factors are indicative in each case of a nominal loss at a geographical location, the impact index is indicative of a total nominal event loss, and the portfolio data store further includes a minimum total nominal event loss and a maximum total nominal event loss for a portfolio;
- an intensity calculation module, implemented by the at least one hardware processor, configured to calculate geometric distances of the geographical locations from a hypocenter of an earthquake event, and to calculate local intensity values for the geographical locations by applying in each case the equation to the magnitude of the earthquake event and the geometric distance of the respective geographical location from the hypocenter; and
- an index calculation module, implemented by the at least one hardware processor, configured to calculate the impact index for the geographical locations by determining in each case from the impact ratio table the impact ratio for the local intensity at the respective geographical location, and adding up the impact ratios weighted in each case by the weighting factor assigned to the respective geographical location, and further configured to calculate an event loss factor as a ratio of an event loss exceeding the minimum total nominal event loss, but not exceeding the maximum total nominal event loss, and a difference of the maximum total nominal event loss and the minimum total nominal event loss.

2. The system of claim 1, wherein the portfolio data store further includes a coverage amount for a portfolio, and the system further comprises a payout module configured to calculate a payout amount by multiplying the event loss factor with the coverage amount.

3. The system of claim 1, further comprising a user interface configured to receive from a user at least one of the impact ratios for different earthquake intensity levels, the weighting factors assigned to the geographical locations, and parameters and mathematical operations for defining the equation.

4. The system of claim 2, further comprising a user interface configured to receive from a user at least one of the impact ratios for different earthquake intensity levels, the weighting factors assigned to the geographical locations, and parameters and mathematical operations for defining the equation.

5. A computer-implemented method for determining an impact index indicative of the impact or damage caused by an earthquake to a portfolio of values or objects associated with different geographical locations, the method comprising:
- storing an equation defined for calculating for a geographical location a local earthquake intensity based on a given distance of the geographical location from a hypocenter of an earthquake, and a given earthquake magnitude of the earthquake;
- storing for the geographical locations one or more impact ratio tables, the impact ratio tables defining in each case impact ratios for different earthquake intensity levels;
- storing portfolio data including geographical locations and individual weighting factors assigned to the geographical locations, wherein the weighting factors are indicative in each case of a nominal value associated with the geographical location, the impact ratios weighted by the weighting factors are indicative in each case of a nominal loss at a geographical location, the impact index is indicative of a total nominal event loss;
- storing for a portfolio a minimum total nominal event loss and a maximum total nominal event loss, and calculating an event loss factor as a ratio of an event loss exceeding the minimum total nominal event loss, but not exceeding the maximum total nominal event loss, and a difference of the maximum total nominal event loss and the minimum total nominal event loss;
- calculating geometric distances of the geographical locations from a hypocenter of an earthquake event;
- calculating local intensity values for the geographical locations by applying in each case the equation to the magnitude of the earthquake event and the geometric distance of the respective geographical location from the hypocenter; and
- calculating, by at least one computer, the impact index for the geographical locations by determining in each case from the impact ratio table the impact ratio for the local intensity at the respective geographical location, and adding up the impact ratios weighted in each case by the weighting factor assigned to the respective geographical location.

6. The method of claim 5, further comprising storing for a portfolio a coverage amount, and calculating a payout amount multiplying the event loss factor with the coverage amount.

7. The method of claim 5, further comprising receiving from a user via a user interface at least one of the impact ratios for different earthquake intensity levels, the weighting factors assigned to the geographical locations, and parameters and mathematical operations for defining the equation.

8. The method of claim 6, further comprising receiving from a user via a user interface at least one of the impact ratios for different earthquake intensity levels, the weighting factors assigned to the geographical locations, and parameters and mathematical operations for defining the equation.

9. A non-transitory computer-readable storage medium having computer readable program codes embodied in the computer readable storage medium that, when executed cause a computer to execute:

storing an equation defined for calculating, for a geographical location, a local earthquake intensity, based on a given distance of the geographical location from a hypocenter of an earthquake, and a given earthquake magnitude of the earthquake;

storing for different geographical locations one or more impact ratio tables, the impact ratio tables defining in each case impact ratios for different earthquake intensity levels;

storing portfolio data relating to a portfolio of values or objects associated with the geographical locations, the portfolio data including geographical locations and individual weighting factors assigned to the geographical locations;

calculating geometric distances of the geographical locations from a hypocenter of an earthquake event;

calculating local intensity values for the geographical locations by applying in each case the equation to the magnitude of the earthquake event and the geometric distance of the respective geographical location from the hypocenter; and calculating an impact index for the geographical locations, indicative of the impact or damage caused by the earthquake to the portfolio, by determining in each case from the impact ratio table the impact ratio for the local intensity at the respective geographical location, and adding up the impact ratios weighted in each case by the weighting factor assigned to the respective geographical location.

* * * * *